United States Patent
Toyooka (10) Patent No.: US 7,866,830 B2
(45) Date of Patent: Jan. 11, 2011

(54) ILLUMINATION DEVICE AND PROJECTOR

(75) Inventor: Takashi Toyooka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 614 days.

(21) Appl. No.: 11/905,092

(22) Filed: Sep. 27, 2007

(65) Prior Publication Data

US 2008/0088914 A1   Apr. 17, 2008

(30) Foreign Application Priority Data

Sep. 29, 2006   (JP)   ............... 2006-267595

(51) Int. Cl.
  *G03B 21/26*   (2006.01)
(52) U.S. Cl. ...................................... 353/94
(58) Field of Classification Search ............ 353/85, 353/94; 362/259, 553, 558, 559, 561; 372/29.023; 359/204.1, 204.5
  See application file for complete search history.

(56) References Cited

U.S. PATENT DOCUMENTS

| | | | |
|---|---|---|---|
| 4,619,508 A * | 10/1986 | Shibuya et al. ............ 353/122 |
| 7,233,304 B1 | 6/2007 | Aratani et al. | |
| 7,360,900 B2 | 4/2008 | Sakata et al. | |
| 2003/0039036 A1* | 2/2003 | Kruschwitz et al. ......... 359/707 |
| 2003/0099264 A1* | 5/2003 | Dantus et al. ................. 372/25 |
| 2006/0227293 A1* | 10/2006 | Kasazumi et al. ............. 353/30 |
| 2007/0058135 A1* | 3/2007 | Morikawa et al. ............. 353/30 |
| 2007/0085978 A1* | 4/2007 | Yamauchi ..................... 353/94 |
| 2008/0079904 A1* | 4/2008 | Bartlett ........................ 353/31 |

FOREIGN PATENT DOCUMENTS

| | | |
|---|---|---|
| CN | 1667500 A | 9/2005 |
| CN | 2809679 Y | 8/2006 |
| JP | A 2000-275604 | 10/2000 |
| JP | A 2004-325576 | 11/2004 |

* cited by examiner

*Primary Examiner*—Georgia Y Epps
*Assistant Examiner*—Bao-Luan Le
(74) *Attorney, Agent, or Firm*—Oliff & Berridge, PLC (57) ABSTRACT

An illumination device includes: a light source section emitting coherent light; and a phase modulation section onto which the coherent light emitted from the light source section is incident, modulating the phase of the coherent light, forming a phase modulation pattern, varying the phase of the coherent light while generating a diffracted light in accordance with the phase modulation pattern, thereby scanning the light onto at least a part of a region of a projection surface.

5 Claims, 8 Drawing Sheets

ILLUMINATION DEVICE AND PROJECTOR

CROSS-REFERENCE TO RELATED APPLICATION

This application claims priority from Japanese Patent Application No. 2006-267595, filed on Sep. 29, 2006, the contents of which are incorporated herein by reference.

BACKGROUND

1. Technical Field

The present invention relates to an illumination device and a projector. In particular, the present invention relates to an illumination device used for a projector.

2. Related Art

A liquid crystal display device or a digital micromirror device (DMD) that is used for a spatial light modulation device in a projector has a characteristic in that luminance of an image is substantially regulated during one frame period of an image signal.

In the case in which a hold-type spatial light modulation device is used, a motion image response may be degraded due to a motion image blurring occurring at the time at when motion images are displayed.

In order to desirably obtain the motion image response, an impulse-type display method can be applied, in that a display light is generated during a period sufficiently shorter than the one frame period.

In the case of the hold-type spatial light modulation device, the impulse-type display method is performed by controlling the spatial light modulation device or by intermittent illumination that intermittently applies illumination light.

In such impulse-type display methods, the impulse-type display method due to the intermittent illumination is excellent in that the efficiency of illumination is not degraded and the dynamic range of the spatial light modulation device is not narrow.

Conventionally, as disclosed in, for example, Japanese Unexamined Patent Application, First Publication No. 2000-275604 and Japanese Unexamined Patent Application, First Publication No. 2004-325576, the technique in which the impulse-type display method is performed by the intermittent illumination of the spatial light modulation device is suggested.

In the technique in Japanese Unexamined Patent Application, First Publication No. 2000-275604, back lights formed on each illumination region are controlled so as to illuminate or turn off.

In this technique, there is an advantage in that it is possible to improve the motion image response due to controlling the illumination light.

In the case of using back lights, it is difficult to adjust each of the back lights in which the dispersion of the amount of illumination or deterioration of illumination with time occur.

In an optical system including a light source and a spatial light modulation device, a special expansion in a space in which a luminous flux exists is shown by the product of the emission area and radiation angle (etendue, Geometrical Extent).

Since the etendue is restricted, it is difficult to efficiently utilize the light emitted from the light source depending on increasing the emission area due to arraying the light sources.

In Japanese Unexamined Patent Application, First Publication No. 2004-325576, the illumination light is scanned onto a projection surface of the spatial light modulation device.

In the impulse-type display method, though the motion image response can be improved, a flicker of the images on the display is easily generated.

The flicker is easily noticed by a viewer, especially, in the case of displaying a still image on the display.

In Japanese Unexamined Patent Application, First Publication No. 2004-325576, since it is impossible to select scanning or non-scanning in accordance with images, it is difficult to suppress the occurrence of flicker.

As described above, though a high efficiency of illumination and a desirable motion image response can be obtained, there is the problem in that it is difficult to suppress the occurrence of flicker.

SUMMARY

An advantage of some aspects of the invention is to provide an illumination device and a projector including the illumination device, in which a high efficiency of illumination and a motion image response can be obtained, and it is possible to suppress the occurrence of flicker.

A first aspect of the invention provides an illumination device including: a light source section emitting coherent light; and a phase modulation section onto which the coherent light emitted from the light source section is incident, modulating the phase of the coherent light, forming a phase modulation pattern, varying the phase of the coherent light while generating a diffracted light in accordance with the phase modulation pattern, thereby scanning the light onto at least a part of a region of a projection surface.

In the illumination device, the region onto which the light is scanned is determined, based on, for example, an image signal.

The phase modulation section allows the light to scan by distributing the light and by varying the phase of the coherent light.

In the region onto which the light is scanned, the impulse-type display method can be used, and it is possible to obtain a desirable motion image response In the region onto which the light is not scanned, the hold-type display method can be used by illuminating the light in a steady-state, and it is possible to suppress the occurrence of flicker.

Since the region onto which the light is scanned can be fitly set by varying the phase modulation pattern, it is possible to arbitrarily change over from the impulse display method to the hold-type display method or from the hold-type display method to the impulse-type display method at each region of the display.

Since the coherent light is incident onto the phase modulation section, it is possible to obtain a desirable diffraction characteristic in the phase modulation section.

Since the light is distributed by using the phase modulation section, it is possible to scan the light without losing the light emitted from the light source section.

Therefore, the illumination device can be attained, in which a high efficiency of illumination and a desirable motion image response can be obtained, and it is possible to suppress the occurrence of flicker.

It is preferable that, in the illumination device of the first aspect of the invention, the phase modulation section include a liquid crystal element.

Using the liquid crystal element, it is possible to easily vary the phase modulation pattern of the coherent light due to controlling of the supply voltage.

It is preferable that, in the illumination device of the first aspect of the invention, the liquid crystal element be an electrically controlled birefringence mode liquid crystal element.

Therefore, it is possible to obtain a high speed response of the phase modulation section, and sufficiently perform the phase modulation due to a low-driving voltage.

It is preferable that, in the illumination device of the first aspect of the invention, the light source section emit the coherent light in accordance with the phase modulation section.

In the illumination device, the light source section is relatedly driven with respect to the phase modulation section, thereby it is possible to emit the coherent light in accordance with a phase modulation signal at a timing at which the liquid crystal element is stabilized.

Therefore, it is possible to prevent uneven illumination by distributing the light with accuracy.

A second aspect of the invention provides a projector including: the illumination device described above, and a spatial light modulation device including the projection surface and modulating the light which has been emitted from the illumination device and which is incident onto the projection surface in accordance with an image signal.

Using the above described illumination device, it is possible to obtain the high efficiency of illumination and the desirable motion image response, and suppress the occurrence of flicker.

Therefore, the projector can be attained, in which a high efficiency of illumination and a desirable motion image response can be obtained, and it is possible to suppress the occurrence of flicker.

It is preferable that, in the projector of the second aspect of the invention, the illumination device include the phase modulation section modulating the phase of the coherent light emitted from the light source section and leading the coherent light to be incident onto the projection surface. In the projector, the phase modulation section varies the phase of the coherent light while generating the diffracted light in accordance with the phase modulation patter and scans the light onto a region of the projection surface. The region is determined based on the image signal.

By analyzing the image signal, it is possible to scan the light onto the region on which the motion image is displayed, and to illuminate the light onto the region on which the still image is displayed in a steady-state.

Therefore, it is possible to perform the impulse-type display method in the region on which the motion image is displayed, and to perform the hold-type display method in the region on which the still image is displayed.

It is preferable that, in the projector of the second aspect of the invention, the projection surface includes a plurality of unit regions set thereon, and the spatial light modulation device includes a region of a pixel. In the projector, the illumination device leads the light to be incident onto each unit region of the projection surface, and the unit region is smaller than the projection surface and is greater than the region of the pixel in the spatial light modulation device.

By setting the unit regions which are smaller than the projection surface, it is possible to scan the light.

Furthermore, it is sufficient that the scanning of the light is performed at the unit region broader than the pixel.

By setting the unit region which is greater than the region of the pixel, it is possible to easily compose the phase modulation section and to easily drive it.

Therefore, it is possible to scan the light using the phase modulation section in which the structure is simple and the driving thereof is easy.

It is preferable that, in the projector of the second aspect of the invention, the phase modulation section vary the phase of the coherent light in accordance with a control signal generated based on a signal different from the image signal.

It is possible to determine the region onto which the light is scanned in relation to, for example, software which is executed in a computer, and based on a signal output from the computer.

Therefore, a structure for an image signal analysis is made simple, and it is possible to determine the region onto which the light is scanned, with high precision.

It is preferable that, in the projector of the second aspect of the invention, the phase modulation section scan the light while synchronizing the writing of visual data to the spatial light modulation device.

In the case of scanning the light while synchronizing the writing of the visual data, it is possible to emit the light when the modulation element is stabilize in a condition in accordance with the visual data.

Therefore, it is possible to efficiently project the light in accordance with the image signal.

DESCRIPTION OF EXEMPLARY EMBODIMENTS

Hereinafter, embodiments of the invention will be described with reference to the accompanying drawings.

Figure 1:
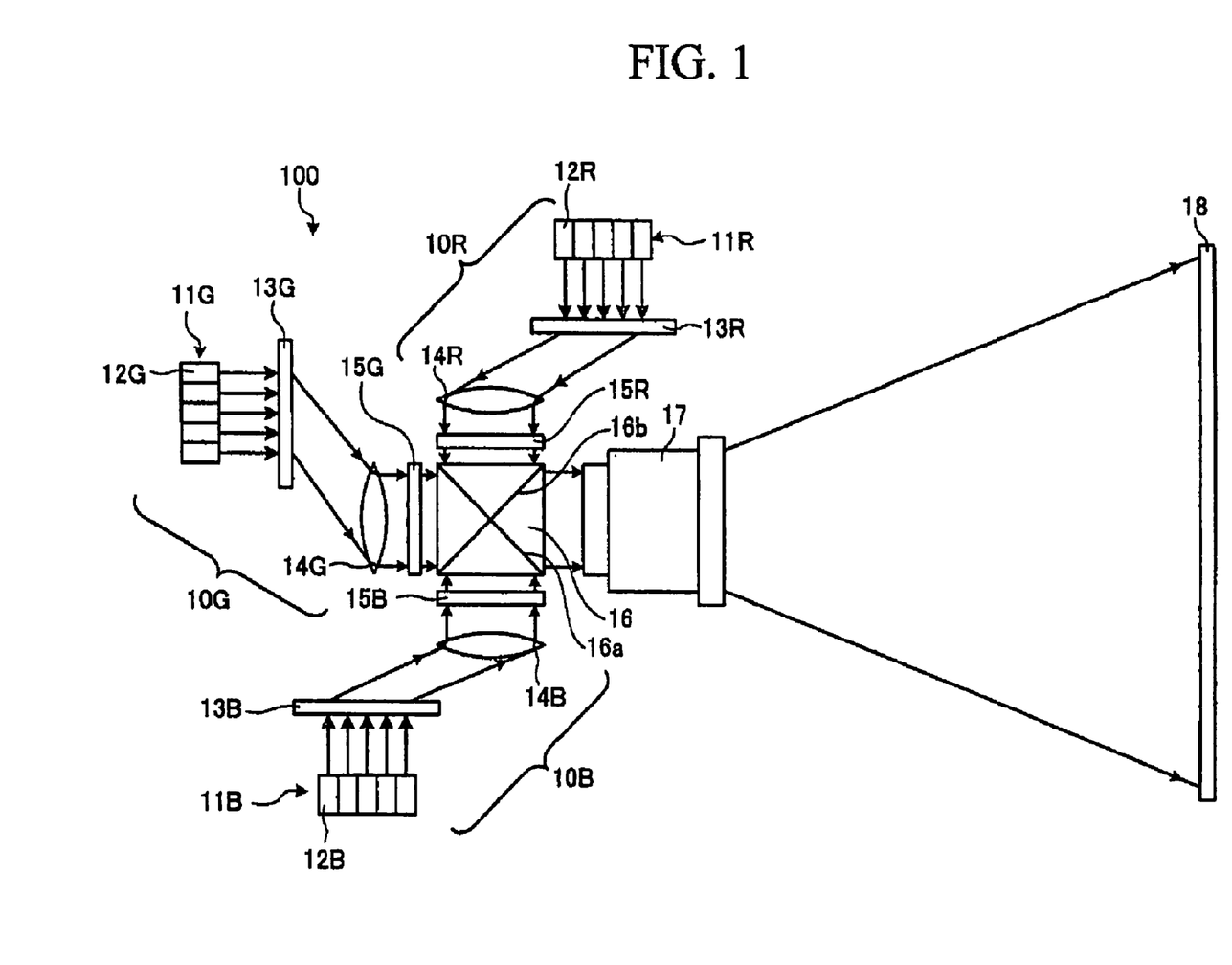
FIG. 1 is a schematic diagram of a projector of an embodiment of the invention.

FIG. 1 is a schematic diagram of a projector 100 of an embodiment of the invention.

The projector 100 is a front projection-type projector that emits light onto a screen 18. The light is reflected at the screen 18. A viewer views the light reflected by the screen 18, and appreciates the images formed from the reflected light.

The projector 100 includes an R light illumination device 10R, a G light illumination device 10G, and B light illumination device 10B.

The R light illumination device 10R emits light colored red. The G light illumination device 10G emits light colored green. The B light illumination device 10B emits light colored blue.

The projector 100 modulates the light emitted from the illumination devices 10R, 10G and 10B in accordance with an image signal, and displays images onto the screen 18.

Figure 2:
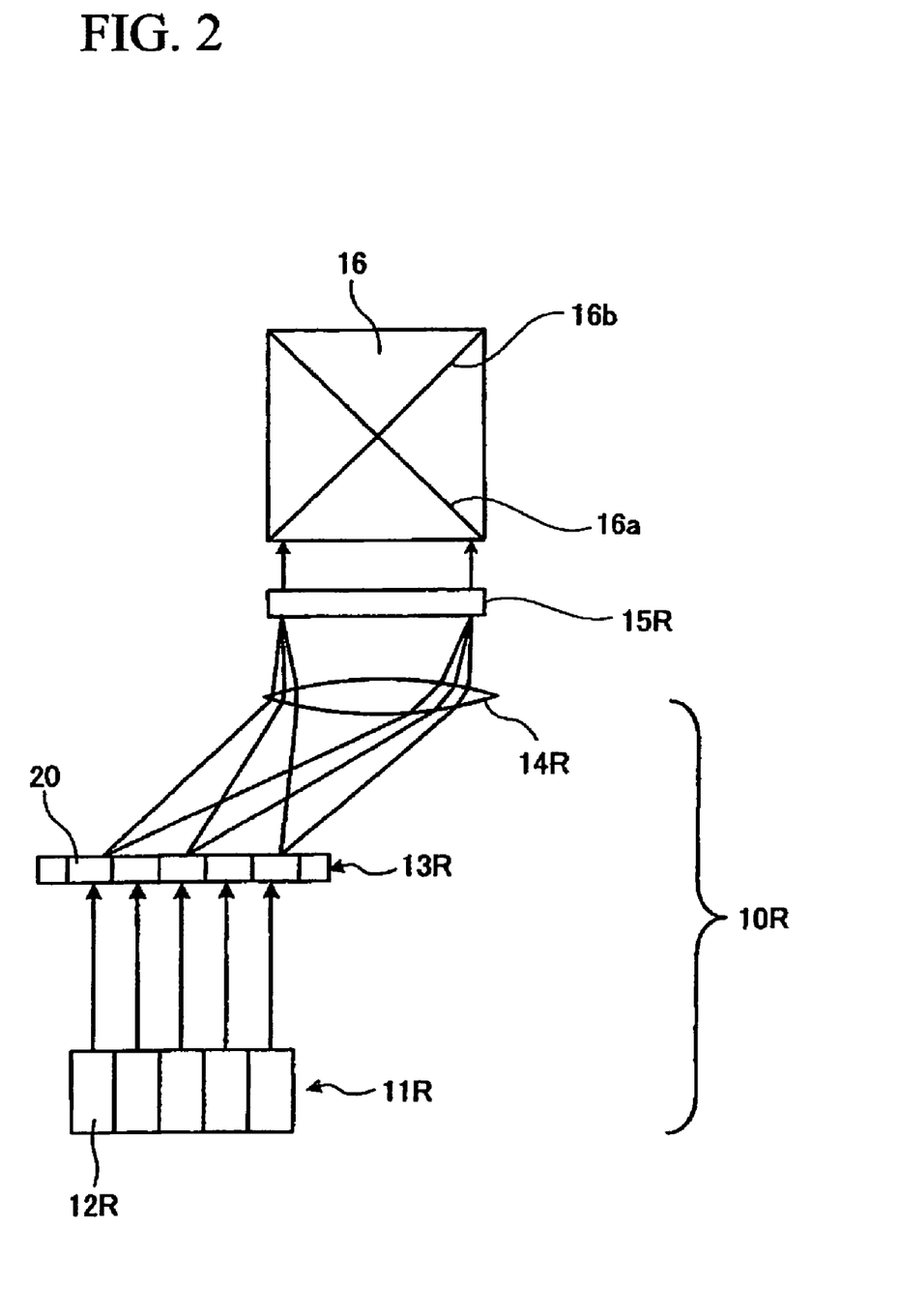
FIG. 2 is a view showing an illumination device, a spatial light modulation device, and a cross dichroic prism.

FIG. 2 is a view showing the R light illumination device 10R, an R light spatial light modulation device 15R, and a cross dichroic prism 16.

The R light illumination device 10R includes R light source section 11R.

The R light source section 11R is a light source section emitting laser light which is coherent light.

The R light source section 11R includes five laser light sources 12R emitting red light.

These five laser light sources 12R are arrayed in parallel in a one-dimensional direction.

The laser light emitted from the laser light sources 12R is polarized light vibrating a specific direction, for example, S-polarized light.

As the laser light source 12R, for example, a semiconductor laser light source may be used.

These five laser light sources 12R emits substantially parallel laser light.

The laser light emitted from the laser light sources 12R is incident onto phase modulation section 13R.

Figure 3:
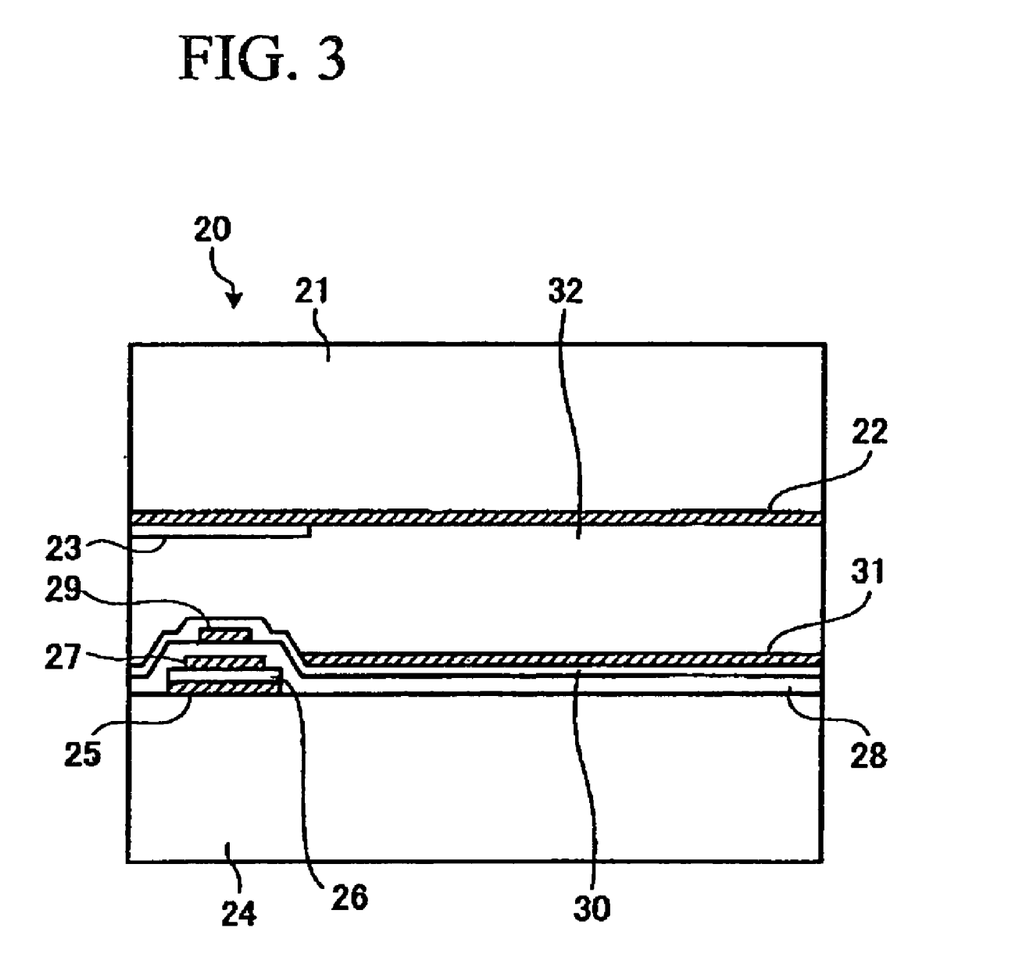
FIG. 3 is a cross-sectional view of a liquid crystal element.

The phase modulation section 13R is a liquid crystal panel including liquid crystal elements 20 as shown in FIG. 3.

In the phase modulation section 13R, the liquid crystal elements 20 are arrayed in accordance with the laser light emitted from the R light source section 11R.

In the phase modulation section 13R, the phase of each laser light emitted from the laser light sources 12R is modulated. The phase modulation section 13R leads the modulated laser light to be incident onto a projection surface of the R light spatial light modulation device 15R.

The phase modulation section 13R generates diffracted light in accordance with the phase modulation pattern formed by the liquid crystal elements 20.

Since the coherent light is incident onto the phase modulation section 13R, it is possible to obtain a desirable diffraction characteristic in the phase modulation section 13R.

The diffracted light emitted from the phase modulation section 13R is incident onto a field lens 14R.

The field lens 14R collimates the light emitted from the phase modulation section 13R, and leads the collimated light to be incident onto the R light spatial light modulation device 15R.

The field lens 14R is disposed at an oblique anterior position viewed from the phase modulation section 13R, and at a position other than a position onto which the zero-dimensional light emitted from the phase modulation section 13R is incident.

The R light spatial light modulation device 15R is a transmissive liquid crystal display device modulating the red light in accordance with the image signal.

The R light spatial light modulation device 15R includes a liquid crystal panel which is not illustrated. In the liquid crystal panel, a liquid crystal layer used for displaying images is enclosed between two transmissive substrates.

The S-polarized light which has been incident onto the liquid crystal panel is converted into P-polarized light by modulation in accordance with the image signal.

The R light spatial light modulation device 15R emits the red light which is converted into P-polarized light by the modulation.

The red light modulated by the R light spatial light modulation device 15R is incident onto the cross dichroic prism 16 which is a color synthesis optical system.

Returning to FIG. 1, both the G light illumination device 10G and the B light illumination device 10B includes the same constitution as the R light illumination device 10R.

The G light illumination device 10G includes a G light source section 11G.

The G light source section 11G is a light source section emitting laser light which is coherent light.

The G light source section 11G includes five laser light sources 12G emitting green light.

The laser light emitted from the laser light source 12G is incident onto a G light spatial light modulation device 15G after passing through a phase modulation section 13G and a field lens 14G.

The G light spatial light modulation device 15G is a transmissive liquid crystal display device modulating the green light in accordance with the image signal.

The G light spatial light modulation device 15G emits the green light which is converted into P-polarized light by the modulation.

The green light modulated by the G light spatial light modulation device 15G is incident onto the cross dichroic prism 16. In the cross dichroic prism 16, the modulated green light is incident onto a portion different from the portion onto which the red light is incident.

The B light illumination device 10B includes a B light source section 11B.

The B light source section 11B is a light source section emitting laser light which is coherent light.

The B light source section 11B includes five laser light sources 12B emitting blue light.

The laser light emitted from the laser light source 12B is incident onto a B light spatial light modulation device 15B after passing through a phase modulation section 13B and a field lens 14B.

The B light spatial light modulation device 15B is a transmissive liquid crystal display device modulating the blue light in accordance with the image signal.

The B light spatial light modulation device 15B emits the blue light which is converted into P-polarized light by the modulation.

The blue light modulated by the B light spatial light modulation device 15B is incident onto the cross dichroic prism 16. In the cross dichroic prism 16, the modulated blue light is incident onto a portion different from the portions onto which the red light and the green light are incident.

The cross dichroic prism 16 includes two dichroic films 16a and 16b that are substantially and orthogonally disposed to each other.

A first dichroic film 16a reflects the red light and leads the green light and the blue light to permeate therethrough.

A second dichroic film 16b reflects the blue light and leads the red light and the green light to permeate therethrough.

In the cross dichroic prism 16, the red light is incident onto a first portion, the green light is incident onto a second portion, and the blue light is incident onto a third portion.

The first portion, the second portion, and the third portion are different portions each other.

The cross dichroic prism 16 synthesizes the red light, the green light, and the blue light.

The cross dichroic prism 16 emits the synthesized light toward a projection lens 17.

The projection lens 17 projects the synthesized light onto the screen 18.

The phase modulation sections 13R, 13G and 13B are not limited to the constitution in which the field lens 14R is disposed at a position other than a position onto which the zero-dimensional light emitted from the phase modulation section 13R are incident.

It is necessary that the phase modulation sections 13R, 13G and 13B can lead the diffracted light to be incident onto the field lenses 14R, 14G and 14B. The phase modulation sections 13R, 13G and 13B may lead the light to be incident onto the field lenses 14R, 14G and 14B that are disposed at a position onto which the zero-dimensional light is incident.

In the projector 100, as the constitution of the spatial light modulation devices 15R, 15G, and 15B, using the transmissive liquid crystal display device is not limited.

As the spatial light modulation device, a reflective liquid crystal display device or a digital micromirror device may be used.

In the illumination devices 10R, 10G and 10B, by using the light source sections 11R, 11G and 11B including the laser light sources 12R, 12G and 12B, it is possible to omit a polarization splitting element for emitting polarized light vibrating a specific direction or a constitution for color separation.

The laser light has a single wavelength, therefore having the characterstics of a high color purity and coherence. Also, since the laser light does not include ultraviolet rays, the laser light has an advantage in that it is possible to suppress the degradation of the liquid crystal element.

Furthermore, since it is possible to miniaturize the laser light sources 12R, 12G and 12B, there are advantages in that it is possible to miniaturize the projector 100 and it is possible to illuminate the laser light sources 12R, 12G and 12B in an instant.

In each of the light source sections 11R, 11G and 11B, the constitution that includes five laser light sources is not limited. A constitution that includes one or a multiple laser light sources may be used.

The light source sections 11R, 11G and 11B are not limited to the constitution in which a plurality of the laser light sources 12R, 12G and 12B is arrayed in parallel in the one-dimensional direction. The laser light sources may be arrayed in a two-dimensional direction.

Since the plurality of the laser light sources 12R, 12G and 12B emits the laser light, each of the light source sections 11R, 11G and 11B can emit the laser light at high power.

Also, since the light source sections 11R, 11G and 11B emit a plurality of the laser light, there is an advantage in that it is possible to suppress speckle noise.

Instead of including the plurality of the laser light sources, each of the light source sections 11R, 11G and 11B may include a laser light source having a plurality of emitting sections.

As the light source sections 11R, 11G and 11B, a wavelength converting element that converts a wavelength of a laser light emitted from a semiconductor laser, for example, a second-harmonic generation element (SHG) may be used.

Instead of the semiconductor laser, as the laser light source, a Diode Pumped Solid State laser (DPSS), solid laser, liquid laser, gas laser, or the like may be used.

FIG. 3 is a cross-sectional view of the liquid crystal element 20 formed in the phase modulation sections 13R, 13G and 13B.

In the liquid crystal element 20, a liquid crystal layer 32 is enclosed between a first transmissive substrate 21 and a second transmissive substrate 24.

A first transmissive electrode 22 is formed between the first transmissive substrate 21 and the liquid crystal layer 32.

The first transmissive electrode 22 may be formed from, for example, indium tin oxide (ITO) or indium zinc oxide (IZO), that is, a metal oxide.

A shading layer 23 is formed at a region between the first transmissive electrode 22 and the liquid crystal layer 32.

Also, an oriented film (not illustrated on which a rubbing treatment is performed is formed between the first transmissive electrode 22 and the liquid crystal layer 32.

A semiconductor layer 25, a gate insulating film 26 formed on the semiconductor layer 25, and a gate electrode 27 formed on the gate insulating film 26 are formed on a region of the second transmissive substrate 24.

The semiconductor layer 25, the gate insulating film 26, and the gate electrode 27 constitute a thin film transistor (TFT). In the TFT, parts of the semiconductor layer 25 are source and drain.

An insulating film 28 formed from silicon oxide or the like is formed on the second transmissive substrate 24 and the TFT.

A signal line 29 is formed on the TFT via the insulating film 28.

The signal line 29 is connected with the source of the TFT.

A scanning line which is not illustrated is connected with the gate electrode 27 which is a gate of the TFT.

A phosphosilicate glass film (PSG film) 30 is formed on the insulating film 28, signal line 29, and the scanning line.

A second transmissive electrode 31 is formed on the portion other than the portion of the PSG film 30 corresponding to the TFT.

Similar to the first transmissive electrode 22, the second transmissive electrode 31 may be formed from the ITO or IZO.

The TFT and the second transmissive electrode 31 are formed at each pixel of the liquid crystal element 20.

Also, the oriented film is formed between the second transmissive electrode 31 and the liquid cop layer 32.

The rubbing direction of the oriented film formed on the second transmissive substrate 24 is parallel and turned with respect to the rubbing direction of the oriented film formed on the first transmissive substrate 21.

Therefore, the liquid crystal element 20 can obtain a constant orientation state in its entirety.

In the liquid crystal element 20, the light is sequentially passed through the first transmissive substrate 21, the liquid crystal layer 32, and the second transmissive elect 31. The liquid crystal element 20 leads the passed light to emit from the second transmissive substrate 24 to the exterior of the liquid crystal element 20.

The liquid crystal element 20 is disposed so that the polarization of the laser light incident onto the first transmissive substrate 21 coincides with the orientation direction of the liquid crystal molecule of the first transmissive substrate 21 side.

Therefore, the laser light emitted from the light source sections 11R, 11G and 11B can be efficiently incident onto the liquid crystal element 20.

Similar to the spatial light modulation devices 15R, 15G and 15B, the phase modulation sections 13R, 13G and 13B are driven by, for example, an active matrix method.

As the liquid crystal element 20, an electrically controlled birefringence mode liquid crystal, for example, a ferroelectric liquid crystal may be used.

The ferroelectric liquid crystal is molecularly low and comparatively has high birefringence.

Using the ferroelectric liquid crystal, it is possible to drive the phase modulation sections 13R, 13G and 13B at high speed response, and it is possible to sufficiently perform phase modulation at low driving voltage.

As the liquid crystal element 20, the electrically controlled birefringence mode liquid crystal element is used. Also, as the liquid crystal element 20, other liquid crystal excluding the ferroelectric liquid crystal, for example, nematic liquid crystal, twisted nematic liquid crystal, or the like may be used.

In the phase modulation sections 13R, 13G and 13B, by using the liquid crystal element 20 in which the distance between the pixels is narrow, it is possible to obtain great diffraction angle.

In order to desirably obtain diffraction characteristics, it is preferable that the distance between the pixels be lower than or equal to 10 μm.

Figure 4:
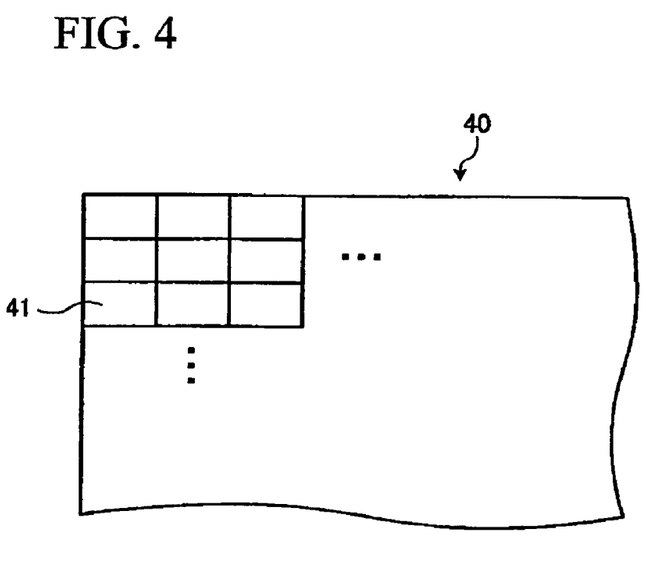
FIG. 4 is a view for explaining unit regions.

FIG. 4 is a view for explaining unit regions 41.

The unit regions 41 are set on a projection surface 40 of the spatial light modulation devices 15R, 15G and 15B.

Each of the phase modulation sections 13R, 13G and 13B leads the liquid crystal element 20 to generate the diffracted light. Therefore, in each of the phase modulation sections 13R, 13G and 13B, the laser light is branched.

In the phase modulation sections 13R, 13G and 13B, by using the liquid crystal element 20, the laser light is distributed, therefore the laser light is incident onto each of the unit regions 41.

Between a phase modulation pattern Φ formed on the projection surface 40 which is distanced from the phase modulation sections 13R, 13G and 13B at a predetermined distance z, and a light wave T of the diffracted light on the projection surface 40, the following formula is given.

$$T(x,y,z) = a(x,y,z) \times \exp[-i\Phi(x,y,z)]$$

Here, (x, y) indicates the coordinate system of the plane orthogonal to the optical axis. Also, a(x, y, z) indicates an amplitude of a light wave.

The intensity of the light wave is given by the square of the amplitude a (x, y, z).

The phase modulation pattern is optimized so as to obtain a target distribution.

The optimized phase modulation pattern can be operated using a specific operation method (simulation method), for example, iteration fourier transform or the like.

The phase modulation sections 13R, 13G and 13B module the phase of the laser light. Thereby, it is possible to constantly vary the distribution of the light.

When the phase modulation sections 13R, 13G and 13B are in a state in that the phases of the light are not varied, the illumination devices 10R, 10G and 10B lead the light to be substantially uniformly incident onto the projection sure 40.

A state in that the phase modulation sections 13R, 13G and 13B lead the light to be substantially uniformly incident onto the projection surface 40 is set as a basis.

Based on the basis, the phase modulation sections 13R, 13G and 13B modulate the phase of the light.

Figure 5:
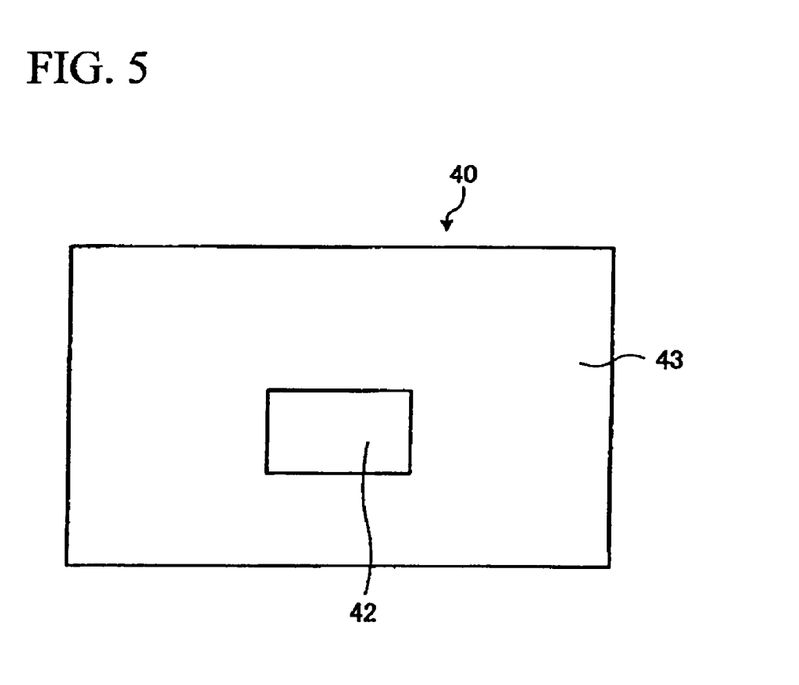
FIG. 5 is a view for explaining light which is incident onto a projection surface.

FIG. 5 is a view for explaining the light which is incident onto the projection surface 40.

The phase modulation sections 13R, 13G and 13B modulate the phase of the coherent light, thereby scanning the light onto a first region 42 which is a region of the projection surface 40.

The first region 42 is positioned, for example, at the vicinity of the center of the projection surface 40.

The position and the scope of the first region 42 can be determined based on the image signal.

In the projection surface 40, a second region 43 is a region other than the first region 42.

The phase modulation sections 13R, 13G and 13B lead the light to be constantly incident onto the second region 43.

In the projection surface 40, the unit of the first region 42 and the unit of the second region 43 are set based on the unit region 41 as shown in FIG. 4.

Figure 6:
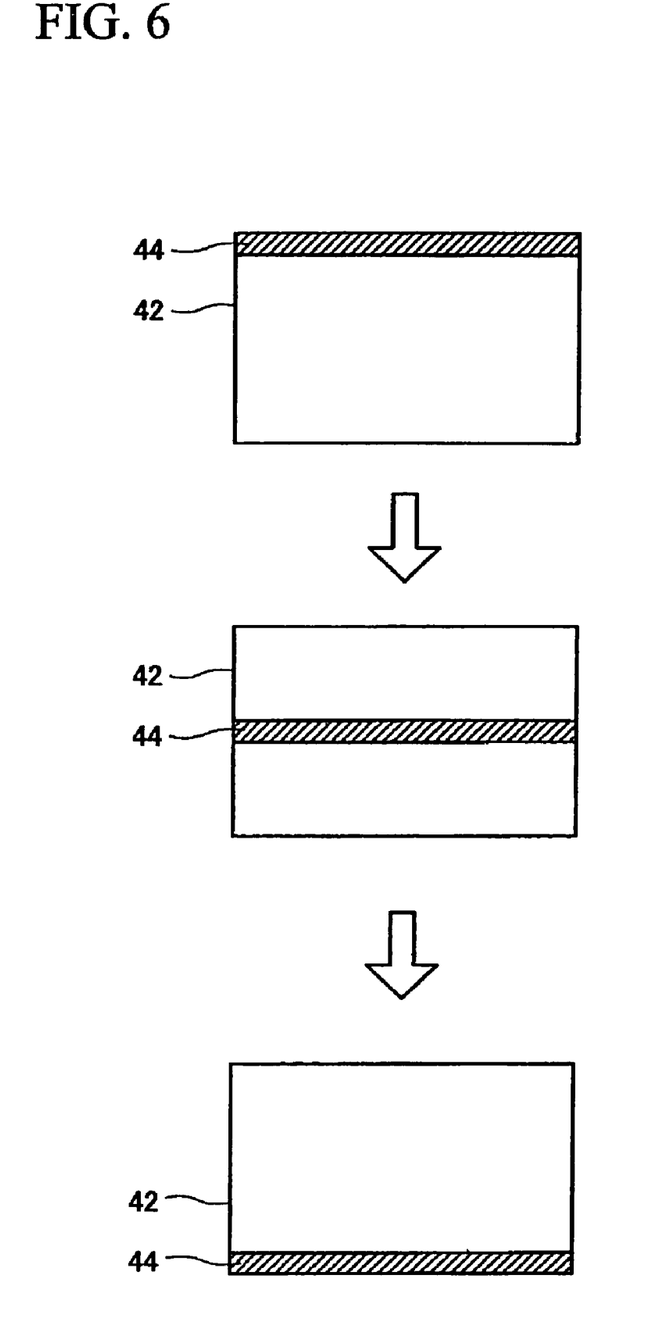
FIG. 6 is a view for explaining scanning of the light in a first region

FIG. 6 is a view for explaining scanning of the light in the first region 42

The phase modulation sections 13R, 13G and 13B lead the light to be incident onto the illumination region 44 in the first region 42. The phase modulation sections 13R, 13G and 13B distribute the light so as to stop the incident light onto a region other than the illumination region 44 in the first region 42.

The illumination region 44 is a zonary region extending in a horizontal direction and in a longitudinal direction. The unit of the illumination region 44 is set based on the unit region 41 as shown in FIG. 4.

The width of the illumination region 44 in a orthogonal direction is greater than the width of the pixel.

The phase modulation sections 13R, 13G and 13B modulate the phase of the coherent light so as to lead the illumination region 44 to scan onto the first region 42 downward.

When the illumination region 44 is reached at the bottom portion of the first region 42, the phase modulation sections 13R, 13G and 13B scan the illumination region 44 toward the top portion of the first region 42 in an instant. The phase modulation sections 13R, 13G and 13B again scan the illumination region 44 onto the first region 42 downward.

The light is distributed from the region other than the illumination region 44 to the illumination region 44 in the first region 42, and scanned onto the first region 42. Thereby, it is possible to obtain high efficiency of illumination and to suppress uneven luminance at the first legion 42 and the second region 43.

When viewing to one pixel in the first region 42, due to scanning the light, the light is intermittently emitted, that is, intermittent illumination is performed.

Therefore, at a portion onto which the light passed through the first region 42 is projected, by performing the impulse-type display method, it is possible to obtain desirable motion image response.

At a portion onto which the light passed through the second region 43 as shown FIG. 5, by performing the hold-type display method, it is possible to suppress the occurrence of flicker.

Since the position and the scope of the first region 42 can be appropriately set by varying the phase modulation pattern, it is possible to switch the impulse type display method or the hold-type display method at each arbitrary region in a display.

In the illumination devices 10R, 10G and 10B, due to distributing the light by the phase modulation sections 13R, 13G and 13B, it is possible to scan the light emitted from the light source sections 11R, 11G and 11B without losing the light.

Therefore, it is possible to obtain high efficiency of illumination and the desirable motion image response, and it is possible to suppress the occurrence of flicker.

It is preferable that the unit region 41 as shown FIG. 4 be smaller than the projection surface 40, and be greater than the region of the pixel in the spatial light modulation devices 15R, 15G and 15B.

Due to setting the plurality of the unit regions 41 smaller than the projection surface 40, it is possible to scan the light.

Also, it is sufficient that the scanning of the light is performed at the unit region broader than the pixel.

Due to setting the unit region 41 broader than the region of the pixel, it is possible to easily drive the phase modulation sections 13R, 13G and 13B, and to simplify the constitution of the phase modulation sections 13R, 13G and 13B.

Therefore, it is possible to scan the light using the phase modulation sections 13R, 13G and 13B including the simplified constitution. In the simplified constitution, the phase modulation sections 13R, 13G and 13B are easily driven.

Figure 7:
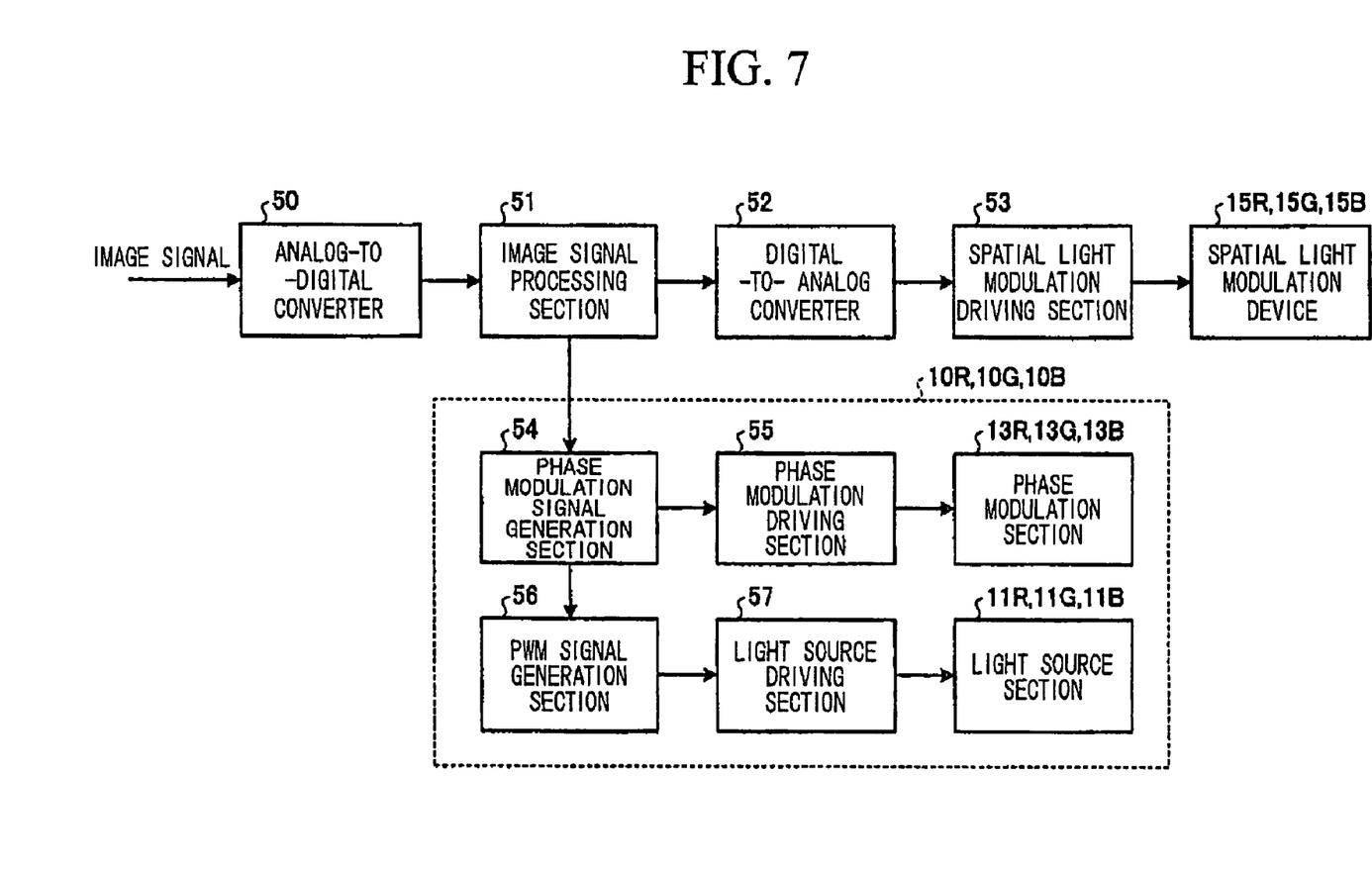
FIG. 7 is a schematic block diagram for driving the projector.

FIG. 7 is a schematic block diagram for driving the projector 100.

The block surrounded by the broken line in FIG. 7 means a block for explaining the driving of the illumination devices 10R, 10G and 10B in the projector 100.

An analog-to-digital converter 50 converts an image signal which is an analog signal into the digital signal.

The analog signal is output from an exterior device and input into the projector 100.

An image signal processing section 51 which is a digital signal processing circuit determines the position and the scope of the motion image among the images displayed in accordance with the image signal converted into the digital signal.

The position and the scope of the motion image is determined based on variation of the visual data during proximal frames.

Figure 8:
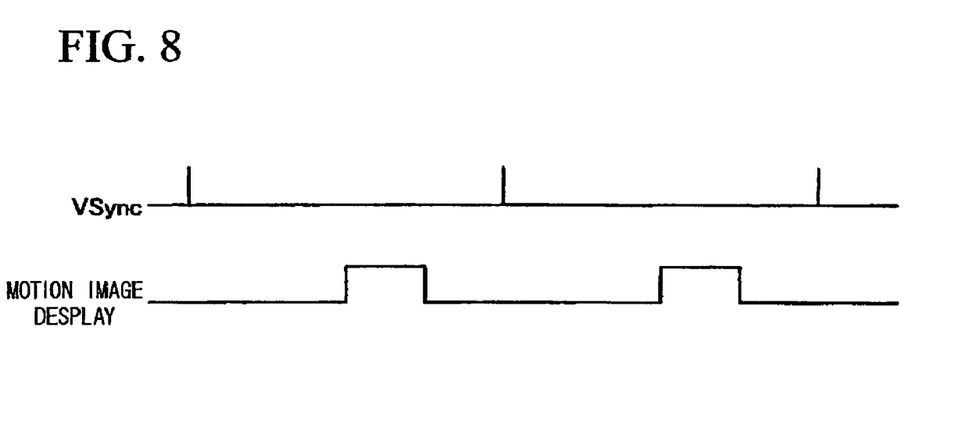
FIG. 8 is a view for explaining a control signal indicating the timing for displaying a motion image.

FIG. 8 is a view for explaining a control signal indicating the timing for displaying a motion image.

Coordinate data indicating the position and the scope of the motion image is defined as a control signal indicating the timing for displaying the motion image.

The timing for displaying the motion image is defined with bringing into connection with a frame period defined by a vertical synchronization signal VSync.

Returning to FIG. 7, the control signal defining the position and the scope of the motion image is input to a phase modulation signal generation section 54 from the image signal processing section 51.

The phase modulation signal generation section 54 determines the phase modulation pattern using the operation method, for example, iteration fourier transform or the like.

As the phase modulation signal generation section 54, a constitution which can perform a high speed operation processing, for example, Graphics Processing Unit (GPU) or Application Specific Integrated Circuit (ASIC) is used, thereby it is possible to perform the operation processing at real-time in accordance with the output of the image signal processing section 51.

Therefore, it is possible to lessen the data which is required to previously store, and minify the memory capacity.

Due to referring to the data previously stored in a look-up table (LUT), the phase modulation signal generation section 54 may output the operation result.

In this case, it is possible to simplify the operation processing in the phase modulation signal generation section 54.

Also, high speed operation processing is unnecessary, thereby it is possible to simplify the circuit structure of the phase modulation signal generation section 54.

A phase modulation driving section 55 drives the phase modulation sections 13R, 13G and 13B in accordance with the phase modulation signal generated in the phase modulation signal generation section 54.

The phase modulation sections 13R, 13G and 13B are controlled in accordance with the phase modulation signal generated based on the image signal.

The phase modulation sections 13R, 13G and 13B vary the phase modulation pattern in accordance with the phase modulation signal, thereby scan the light onto the first region 42 as shown in FIG. 5, and lead the light to be constantly incident onto the second region 43.

The position and the scope of the first region 42 can be appropriately determined on the projection surface 40.

In accordance with the image signal, the first region 42 may be set as the entire projection surface 40, or the second region 43 may be set as the entire projection surface 40.

A pulse width modulation signal generation section (PWM signal generation section) 56 generates a PWM signal for emitting the coherent light in accordance with the phase modulation sections 13R, 13G and 13B.

The pulse width of the PWM signal is modulated in accordance with the phase modulation signal generated in the phase modulation signal generation section 54.

A light source driving section 57 drives the light source sections 11R, 11G and 11B in accordance with the PWM signal generated in the PWM signal generation section 56.

The light source sections 11R, 11G and 11B emit the coherent light modulated in accordance with the PWM signal.

The light source sections 11R, 11G and 11B relatedly drive with the phase modulation sections 13R, 13G and 13B. Thereby it is possible to emit the coherent light in accordance with the phase modulation signal and drive the liquid crystal element 20 as shown in FIG. 3 in stabilized timing.

Therefore, it is possible to prevent uneven illumination by distributing the light with accuracy.

A digital-to-analog converter 52 converts the image signal generated in the image signal processing section 51 into an analog signal.

A spatial light modulation driving section 53 drives the spatial light modulation devices 15R, 15G and 15B in accordance with the image signal converted into the analog signal.

The spatial light modulation devices 15R, 15G and 15B modulate the light emitted from the illumination devices 10R, 10G and 10B in accordance with the image signal.

Figure 9:
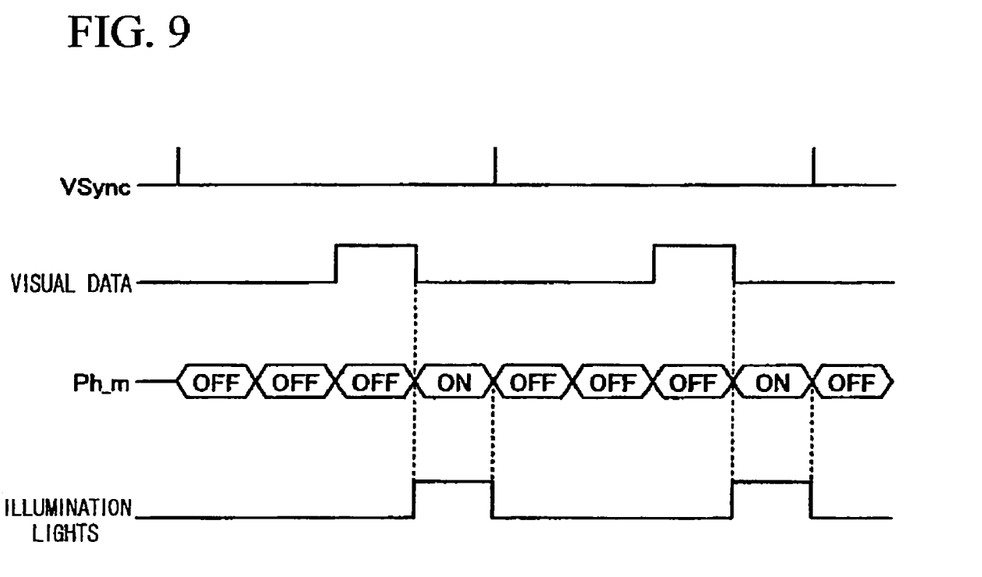
FIG. 9 is a view for explaining the timing for the light to be incident onto a unit region.

FIG. 9 is a view for explaining the timing for the light incident onto a unit region 41 (shown in FIG. 4) in the first region 42.

The phase modulation sections 13R, 13G and 13B generate a phase modulation pattern Ph_m so that the emitting of the illumination light is delayed with respect to the writing of visual data to a unit region 41.

The phase modulation sections 13R, 13G and 13B scan the light while synchronizing the writing of the visual data to the spatial light motion devices 15R, 15G and 15B.

In this case, it is possible to sufficiently ensure the length of time from the writing of the visual data to the leading of the lights to be incident. Therefore, it is possible to emit the light at a timing at which the liquid crystal element 20 is driven in accordance with the visual data and at which the liquid crystal element 20 is stabilized.

Therefore, it is possible to efficiently project the light in accordance with the image signal.

En FIG. 9, the phase modulation pattern Ph_m can be switched from ON to OFF or from OFF to ON at 4 times in a frame period.

The case of four times of the switchable number of the phase modulation pattern Ph_m is not limited. The switchable number may be set greater than or equal to four times.

As described above, by distributing the light on the first region 42 as shown FIG. 5, and by scanning the light, it is possible to suppress the uneven luminance at the first region 42 and the second region 43.

However, the uneven luminance may be generated at the first region 42 and the second region 43 caused by the response of liquid crystal or the like.

Therefore, in the projector 100, it is desirable that a gamma characteristic be adjusted in the image signal processing section 51.

Thus, in the section in which the impulse-type display method is performed, and in the section in which the hold-type display method is performed, it is desirable that the gamma characteristic be adjusted in the image signal processing section 51.

Thereby, it is possible to display the images with high quality while the uneven illumination is suppressed.

In the above described embodiment, the illumination devices 10R, 10G and 10B vary the phase of the coherent light in accordance with the image signal.

The structure of the illumination devices 10R, 10G and 10B is not limited in the invention.

Figure 10:
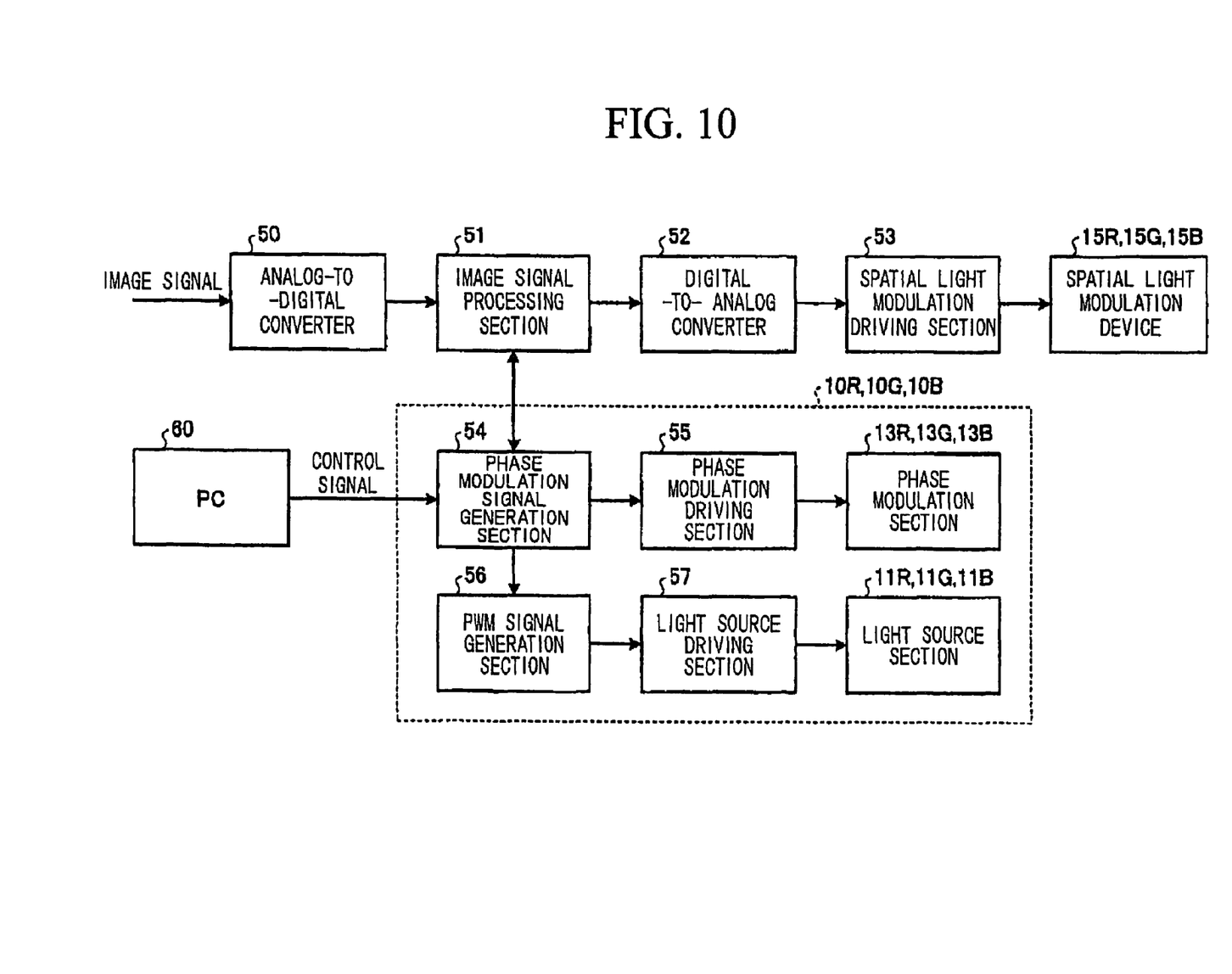
FIG. 10 is a schematic block diagram for explaining the case of varying the phase of coherent light in accordance with a control signal from a PC.

As shown in FIG. 10, the illumination devices 10R, 10G and 10B may vary the phase of the coherent light in accordance with not only the above described image signal, but also a control signal generated in a personal computer (PC) 60.

For example, the PC 60 executes software leading a motion image to display on a motion image display region which is a part of the display.

The PC 60 outputs a control signal relative to the position and scope of the motion image display region.

The phase modulation signal generation section 54 generates the phase modulation signal in accordance with not only the control signal generated in the image signal processing section 51, but also the control signal generated in the PC 60.

The phase modulation sections 13R, 13G and 13B vary the phase of the coherent light in accordance with the control signal generated in the image signal processing section 51 and the control signal generated in the PC 60.

Also, the image signal processing section 51 converts the images in accordance with the control signal processed by the PC 60 and the phase modulation signal generation section 54.

Therefore, the projector 100 relatedly displays the images with the software executed in the PC 60.

As described above, since the phase of the coherent light is varied in accordance with not only the image signal but also the control signal generated in the PC 60, the structure for the image signal analysis is simplified, and it is possible to determine the region onto which the light is scanned with high precision.

The case in which the phase modulation sections 13R, 13G and 13B vary the phase of the coherent light in accordance with the control signal generated in the PC 60, is not limited.

The phase modulation sections 13R, 13G and 13B may vary the phase of the coherent light in accordance with the control signal generated based on another signal different from the image signal.

The projector 100 is not limited to the front projection-type projector.

The projector 100 may be a so-called rear projection-type projector.

In the rear projection-type projector, the light is projected onto a first surface of a screen. A viewer views the light emitted from a second surface opposite to the first surface of the screen, and appreciates images formed from the light emitted from the second surface of the screen.

Also, this invention may be applied to a direct view-type display using the liquid crystal display device.

As described above, the illumination device of the invention is applicable to a projector projecting the light in accordance with the image signal.

What is claimed is:

1. A projector comprising:
   an illumination device including:
      a light source section emitting coherent light; and
      a phase modulation section onto which the coherent light emitted from the light source section is incident, modulating a phase of the coherent light, forming a phase modulation pattern, varying the phase of the coherent light while generating a diffracted light in accordance with the phase modulation pattern, thereby scanning the light onto at least a part of a region of a projection surface; and
   a spatial light modulation device including the projection surface and modulating the light which has been emitted from the illumination device and which is incident onto the projection surface in accordance with an image signal.

2. The projector according to claim 1, wherein
   the illumination device includes the phase modulation section modulating the phase of the coherent light emitted from the light source section and leading the coherent light to be incident onto the projection surface, wherein
   the phase modulation section varies the phase of the coherent light while generating the diffracted light in accordance with the phase modulation pattern, and scans the light onto a region of the projection surface, the region being determined based on the image signal.

3. The projector according to claim 1, wherein
   the projection surface includes a plurality of unit regions set thereon, and the spatial light modulation device includes a region of a pixel, and wherein
   the illumination device leads the light to be incident onto each unit region of the projection surface, and the unit region is smaller than the projection surface and is greater than the region of the pixel in the spatial light modulation device.

4. The projector according to claim 1, wherein
   the phase modulation section varies the phase of the coherent light in accordance with a control signal generated based on a signal different from the image signal.

5. The projector according to claim 1, wherein
the phase modulation section scans the light while synchronizing the writing of a visual data to the spatial light modulation device.

* * * * *